United States Patent
Grabmann et al.

(10) Patent No.: US 6,196,376 B1
(45) Date of Patent: Mar. 6, 2001

(54) SUPPORT DEVICE

(75) Inventors: Peter Grabmann, Sainbach; Dag Heinrich, Penzberg, both of (DE)

(73) Assignee: Joh. Winklhofer & Söhne GmbH & Co. KG, Munich (DE)

(*) Notice: Subject to any disclaimer, the term of this patent is extended or adjusted under 35 U.S.C. 154(b) by 0 days.

(21) Appl. No.: 09/246,049

(22) Filed: Feb. 8, 1999

(30) Foreign Application Priority Data

Feb. 19, 1998 (DE) .......................................... 298 02 927 U

(51) Int. Cl.[7] .................................................. B65G 15/60
(52) U.S. Cl. ........................................ 198/837; 198/861.1
(58) Field of Search .................................. 198/837, 840, 198/841, 861.1

(56) References Cited

U.S. PATENT DOCUMENTS

| | | | |
|---|---|---|---|
| 3,651,924 | * | 3/1972 | Homeier et al. .................... 198/840 |
| 3,655,026 | * | 4/1972 | Hirn ............................... 198/463.2 |
| 3,706,371 | * | 12/1972 | Hirota ............................... 198/838 |
| 3,857,473 | * | 12/1974 | Kornylak ............................ 198/789 |
| 4,029,199 | * | 6/1977 | Reens ............................... 198/683 |
| 4,164,283 | * | 8/1979 | Flajnik ............................. 198/840 |
| 4,202,442 | * | 5/1980 | David ............................... 198/820 |
| 4,275,809 | * | 6/1981 | Garvey et al. ....................... 198/524 |
| 4,440,294 | * | 4/1984 | Langen ............................. 198/838 |
| 4,645,070 | * | 2/1987 | Homeier ............................. 198/831 |
| 4,856,646 | * | 8/1989 | Sjostrand ......................... 198/836.1 |
| 4,917,232 | * | 4/1990 | Densmore ........................... 198/830 |
| 4,966,929 | * | 10/1990 | Tomoshige et al. ..................... 524/71 |
| 5,000,483 | * | 3/1991 | Blumel et al. ....................... 280/847 |
| 5,119,939 | * | 6/1992 | Teeter et al. ....................... 198/860.2 |
| 5,174,437 | * | 12/1992 | Burger .............................. 198/842 |
| 5,217,103 | * | 6/1993 | Umlauf ............................ 198/890.1 |
| 5,332,083 | * | 7/1994 | Axmann ............................. 198/831 |
| 5,944,171 | * | 8/1999 | Vertogen et al. ..................... 198/837 |

FOREIGN PATENT DOCUMENTS

| | | |
|---|---|---|
| 3149555 | 6/1983 | (DE) . |
| 3726059 | 12/1988 | (DE) . |
| 2600740 | 12/1987 | (FR) . |
| 2127372 | 4/1984 | (GB) . |

* cited by examiner

*Primary Examiner*—Kenneth W. Noland
(74) *Attorney, Agent, or Firm*—Armstrong, Westerman, Hattori, McLeland & Naughton

(57) ABSTRACT

The present invention refers to a support device for applying a lateral guiding force in the case of side-arc link chains, comprising a side-arc link chain and a support element moving together with said side-arc link chain and supporting it laterally on the inner side of the chain arc. For providing a support device of the type cited at the start which requires much less constructional outlay and can be produced at a much more moderate price and which, in addition, requires little mounting space, the present invention is so conceived that the support element is defined by an endless traction means which is guided with the aid of deflection means and supported by guide means.

15 Claims, 2 Drawing Sheets

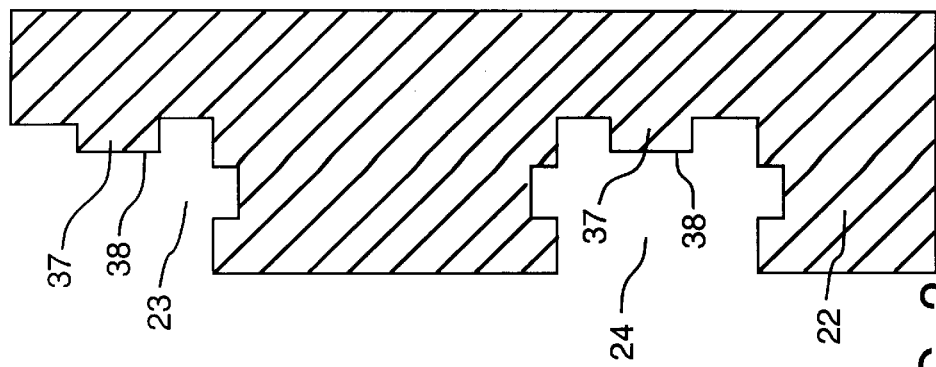
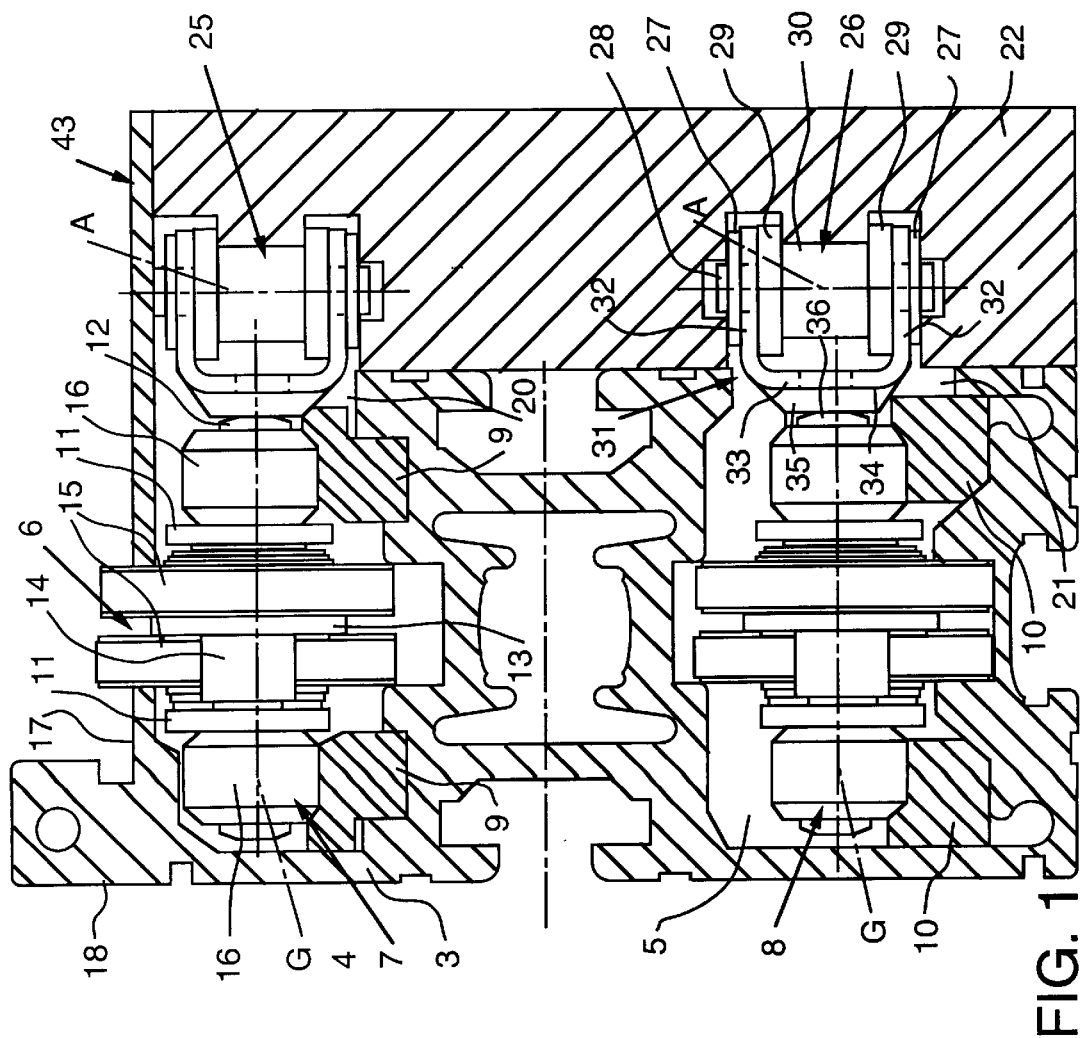

SUPPORT DEVICE

FIELD OF THE INVENTION

The present invention refers to a support device for applying a lateral guiding force in the case of side-arc link chains, comprising a side-arc link chain and a support element moving together with said side-arc link chain and supporting it laterally on the inner side of the chain arc.

BACKGROUND OF THE INVENTION

A known side-arc link chain is disclosed e.g. by German Utility Model G 297 05 311. More precisely, the link chain described in this reference is an accumulation conveyor chain permitting in addition to the normal pivotal movement, of the individual chain links about the hinge-bolt axis also a tilting movement with regard to said hinge-bolt axis. This has the effect that such chains can also be guided in a lateral arc. This means that this accumulation conveyor chain can carry out an arcuate movement in a plane orientated essentially parallel to the hinge-bolt axes. In most cases two accumulation conveyor chain lines which are arranged in parallel juxtaposed relationship are used as a conveying path. Each of the accumulation conveyor chains is then guided in a rail system.

Conveying with such a conveying path becomes problematic in cases where the accumulation conveyor chain moves along a lateral arc. The reason for this is that a lateral guiding force has to be applied, since, due to the constantly varying drawing direction from one chain link to the next, the chain endeavours to move towards the inner side of the chain arc. Hence, lateral guidance is required in the area of the chain arc. In view of the comparatively strong forces, slideways cannot be used. Up to now, the inner side-arc chain of such conveying paths has been implemented shorter so that it ended before the arc. A comparatively large and massive rotary plate then carried out the function of the inner side-arc chain. The rim of the rotary plate laterally supports the outer side-arc chain. The relative speed between the outer side-arc chain and the rotary plate is equal to zero so that no friction occurs. The surface of the rotary plate must be a suitably smooth surface so that, in the case of an accumulation of the articles, the plate can slide below the articles. Most of the rotary plates are therefore made from stone or they are provided with a low-friction surface, consisting e.g. of teflon. A further disadvantage of this device is to be seen in the fact that not only the conveying upper chain half of the side-arc chain but also the returning lower chain half must be supported in the area of the arc. Since the lower chain half moves, however, in the opposite direction, it cannot be supported by the same rotary plate. A separate plate rotating in the opposite direction is required for this purpose.

It is now the object of the present invention to provide a support device of the type cited at the start which requires much less constructional outlay and can be produced at a much more moderate price. In addition, the support device should require little mounting space.

SUMMARY OF THE INVENTION

According to the present invention, this object is achieved by the features that the support element is defined by an endless traction means which is guided with the aid of deflection means and supported by guide means. Traction means in the sense of the present invention are all belt- or chain-shaped circulating endless elements, such as conveyor belts, belts and chains, provided that, when suitably supported by the guide means, they are able to apply to and to absorb from the side-arc link chain a sufficient lateral guiding force. The advantage of such a construction is to be seen in the fact that, in spite of a compact structural design, a support moving together with the side-arc link chain can still be provided in the area of the chain arc. Since the traction means in question is an endless traction means, it circulates in a manner similar to the side-arc link chain and requires only the width which is necessary for a suitable deflection and return movement of the non-supporting empty chain half. The use of a large, bulky rotary plate can be dispensed with. Hence, a side-arc link chain supported in this way can also be guided closely round installations/equipment in workshops, e.g. a column. The support element according to the present invention has a width which is so narrow that even in a conveying path consisting of at least two side-arc chains which are arranged in parallel it will not be necessary to provide an interruption in the chain that constitutes the inner side-arc chain in the chain arc. The space between the two side-arc chains normally suffices for returning the non-supporting empty chain half of the traction means. In most cases, the traction means need not be driven separately, since the force which the side-arc link chain applies to the traction means suffices to drive said traction means.

In a further embodiment, a link-plate chain is used as a traction means. Since such link-plate chains are made from steel in most cases, high lateral guiding forces can be absorbed. The deflection of a link-plate chain is carried out by means of a chain wheel in a simple manner. Chain wheels can also be used as guide means.

An advantageous embodiment can be so conceived that the link-plate chain comprises chain links interconnected at hinge points, that each hinge point comprises a hinge bolt and a hinge sleeve, that the chain links have attached thereto support bows which have a substantially U-shaped cross-section and the U-legs of which are connected to the hinge bolts, the U-connector of said support bows being provided with a support surface for supporting the side-arc link chain. This is a structurally simple embodiment on the basis of which a suitable support surface for absorbing the lateral guiding force can be arranged on a conventional link-plate chain.

In order to prevent the support surface and the parts of the side-arc link chain resting thereon from being damaged, a damping coating can be applied to the support surface of the link-plate chain. Elastomers which are applied by vulcanization and which fulfill the function in question are particularly useful in this respect.

In order to achieve a supporting effect that is as uniform as possible, a further variant is so conceived that the side-arc link chain comprises chain links interconnected at hinge points, that each hinge point comprises a hinge bolt and a hinge sleeve, and that the side-arc link chain and the link-plate chain are arranged relative to one another in such a way that at least the number of hinge bolts of the side-arc link chain which is required for a sufficient supporting effect rests on the support surface of the support bows of the link-plate chain. The desired number results from the lateral guiding forces to be expected and can easily be determined by a design engineer.

A preferred embodiment, can, however, be so conceived that each hinge bolt of the side-arc link chain rests on a support surface of a support bow of the link-plate chain. For this purpose, the distance between the hinge bolts of the side-arc link chain and the distance between the hinge bolts of the link-plate chain can be identical. Hence, each hinge bolt is supported so that no undesired forces can occur in unsupported hinge points.

In order to permit the use of simple structural designs of link-plate chains, the hinge-bolt axes of the side-arc link chain are orientated transversely to the hinge-bolt axes of the supporting link-plate chain according to one embodiment. The link-plate chain is less sensitive with regard to forces orientated in this direction.

A particularly advantageous arrangement is so conceived that the hinge-bolt axes of the side-arc link chain are orientated substantially perpendicular to the hinge-bolt axes of the supporting link-plate chain. This prevents a transmission of undesired tilting forces to the link-plate chain, which forces would result in a torsional load. This also prevents the generation of additional transverse forces at the contacting surfaces, since said contacting surfaces meet at right angles.

In addition, the present invention can be so conceived that the U-legs of the support bow are arranged substantially perpendicular to the hinge-bolt axis of the link-plate chain and that the respective U-legs of a support bow are secured to two neighbouring hinge bolts, that the U-connector of each support bow is arranged such that the support surface extends substantially parallel to the hinge-bolt axes, and that the hinge bolts of the side-arc link chain rest on the support surface via their end face arranged on the inner side of the chain arc. The force exerted by each hinge bolt of the side-arc link chain is therefore absorbed by two hinge bolts. To be exact, the respective support bow is supported via four support points for absorbing the force in question. This results in a uniform load distribution and in a correspondingly reduced load on a link-plate chain.

A further advantageous embodiment is so conceived that the supporting link-plate chain is provided with rollers which are rotatably supported on the hinge sleeves of said chain, that a guide rail which is adapted to the chain arc and which has a guide surface is provided as a guide means, and that the link-plate chain and the guide rail are arranged in such a way that the rollers rest on the guide surface and are adapted to roll along said guide surface. It follows that the guide means consists of a simple rail provided with a running surface for the rollers of a roller chain. Like the rolling elements of a bearing, these rollers then roll on the guide rail in a low-friction movement.

The simplest way of implementing such a support is when, according to one variant, the guide surface is orientated parallel to the hinge-bolt axes of the link-plate chain and when it has a width which is smaller than the smallest distance between two parallel opposed link plates of the link-plate chain. Hence, the link plates of the link-plate chain define a lateral boundary and guarantee that the link-plate chain remains on the guide rail.

In accordance with a preferred embodiment, the side-arc link chain can be an accumulation conveyor chain which is guided in a guide-rail structure and which comprises rollers rolling on guide surfaces of said guide-rail structure The guide surfaces can be formed e.g. by separate, wear-resistant elements so as to minimize the friction conditions. In addition, the inventor found out that hitherto used guide-rail structures can be given an arcuate shape and that a very small modification of such guide-rail structures will suffice to provide a suitable support.

The conveying upper chain half and the returning lower chain half of the side-arc link chain are arranged in said guide-rail structure, the upper chain half having associated therewith a first support element and the lower chain half having associated therewith a second support element. Since the lower chain half moves in a direction opposite to that of the upper chain half, a separate support by the second support element is recommended. Here again a very small construction space suffices to achieve the advantageous supporting effect.

In addition, guide elements can be provided which urge the returning empty chain half of the support element into an at least approximately arcuate shape so that the width of the support element is small. Such guide elements can have different structural designs. Since the returning empty chain half is not acted upon by a lateral guiding force, it can be guided by means of simple slide rails. This will be advantageous especially in cases where link-plate chains with support bows are used. Rollers or similar support elements can, however, be used as well.

In addition, the present invention refers to a conveying path comprising at least two side-arc link chains which are arranged in parallel to one another, said conveying path being provided with at least one conveying arc and comprising additionally a support device according to one of the claims 1 to 14, which is associated with a respective side-arc link chain in the area of said conveying arc and which includes said side-arc link chain. Unlike conveying paths according to the prior art, such a conveying path does not need a rotary plate in the area of the conveying arc, although a low-wear support of the lateral guiding forces is still effected. These advantages especially also result from the fact that no relative movement between the traction means and the side-arc link chain takes place in the area of the support. In addition, such conveying paths maintain also in the area of the curve their respective conveying functions. This will be particularly noticeable in the case of accumulation conveyor chains having the desired retarding function.

BRIEF DESCRIPTION OF THE DRAWINGS

In the following, one embodiment of the present invention will be explained in detail on the basis of a drawing, in which:

FIG. 1 shows a cross-section through a support device, in a plane indicated by I—I in FIG. 4, the empty chain half of the support element being not shown so as to facilitate illustration, FIG. 2 shows solely the support rail of FIG. 1, which is used for supporting and guiding the support element.

FIG. 1 shows a cross-sectional view of the outer track 1 of the conveying path shown in FIG. 4, said conveying path comprising also an inner track 2 (FIG. 4).

Figure 3:
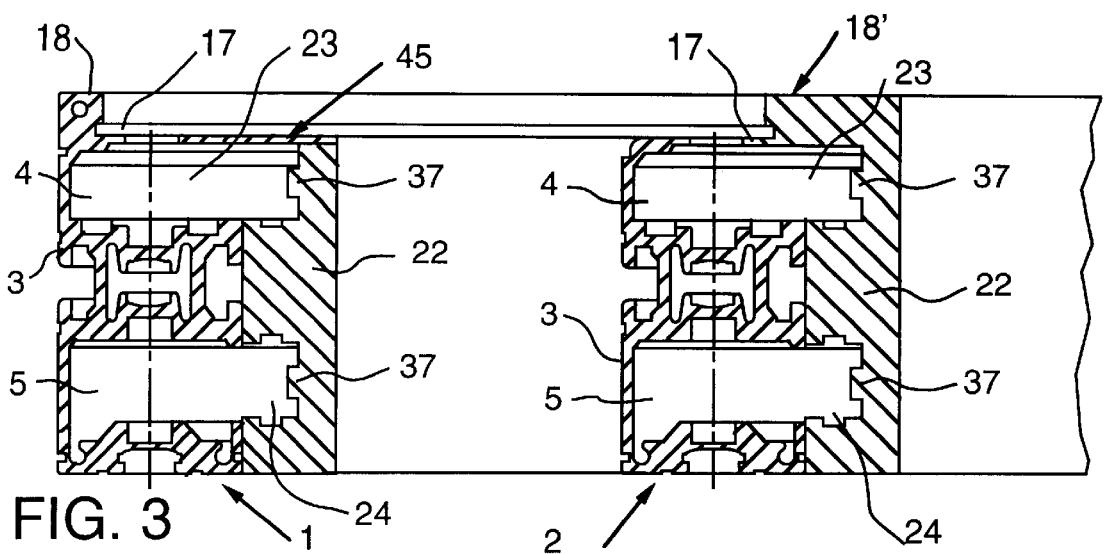
FIG. 3 shows a cross-sectional view in a plane indicated by III—III in FIG. 4, through the guide-rail structure of a conveying arc for a conveying path, the empty chain half of the support element being not shown.

The outer track 1 comprises essentially a rail structure 3 consisting of an extruded aluminium profile. This rail structure has provided therein an upper channel 4 and a lower channel 5 in which an accumulation conveyor chain 6 is arranged, said accumulation conveyor chain being implemented as a side-arc link chain. The upper channel 4 has arranged therein the conveying upper chain half 7 and the lower channel 5 has arranged therein the returning lower chain half 8 of one and the same accumulation conveyor chain 6. Rail profiles 9 and 10 of wear-resistant material, e.g.

steel, along which the accumulation conveyor chain 6 rolls are inserted in said channels. The accumulation conveyor chain 6 consists of external chain links interconnected at hinge points and provided with the outer link plates 11 and the hinge bolts 12 and of internal chain links provided with the inner link plate 13 and the hinge sleeve 14. Each external chain link is provided with two hinge bolts 12 extending through a respective hinge sleeve 14 of a neighbouring internal chain link. Each internal chain link comprises two hinge sleeves 14. A rotatably supported accumulation conveyor roller 15 rests on each hinge sleeve 14. The accumulation conveyor rollers 15 of an internal chain link are located on respective alternate sides of the inner link plate 13 so that they are arranged in displaced relationship with one another. The accumulation conveyor rollers 15 are preferably made of plastic material and they are arranged on the hinge sleeves 14 such that they are easily rotatable. The hinge bolts 12 project laterally beyond the outer link plates 11. Rollers 16 are rotatably arranged on the end portions of said hinge bolts 12; said rollers 16 rest on and roll along the rail profiles 9 and 10. It follows that a respective roller 16 is provided on each end portion of the hinge bolt 12. The accumulation conveyor rollers 15 are arranged within the channels 4 and 5 in such way that they are freely rotatable. The outer track 1 of the rail structure 3 is provided with a marginal stop rail 18 projecting beyond the conveying side 17 thereof. This rail 18 prevents the articles conveyed on the conveying path from falling off the side. In addition, the rail structure 3 has on the conveying side thereof a longitudinal opening through which the accumulation conveyor rollers 15 extend such that they project beyond said conveying side 17 to a certain extent. The length of the projecting portion must precisely be such that the articles to be conveyed do not come into contact with said conveying side 17, but rest on the accumulation conveyor rollers 15. The hinge-bolt axis C is arranged such that it extends substantially parallel to said conveying side 17.

The accumulation conveyor chain 6 is driven by means of suitable drive elements, e.g. chain wheels, which engage the spaces between the rollers 16. The upper chain half 7 in the upper channel 4 moves e.g. out of the plane of FIG. 1 towards the viewer. At the end of the conveying path, the accumulation conveyor chain 6 is deflected and the lower chain half 8 is returned in the lower channel 5 so that said lower chain half 8 moves out of the plane of the figure away from the viewer.

Figure 4:
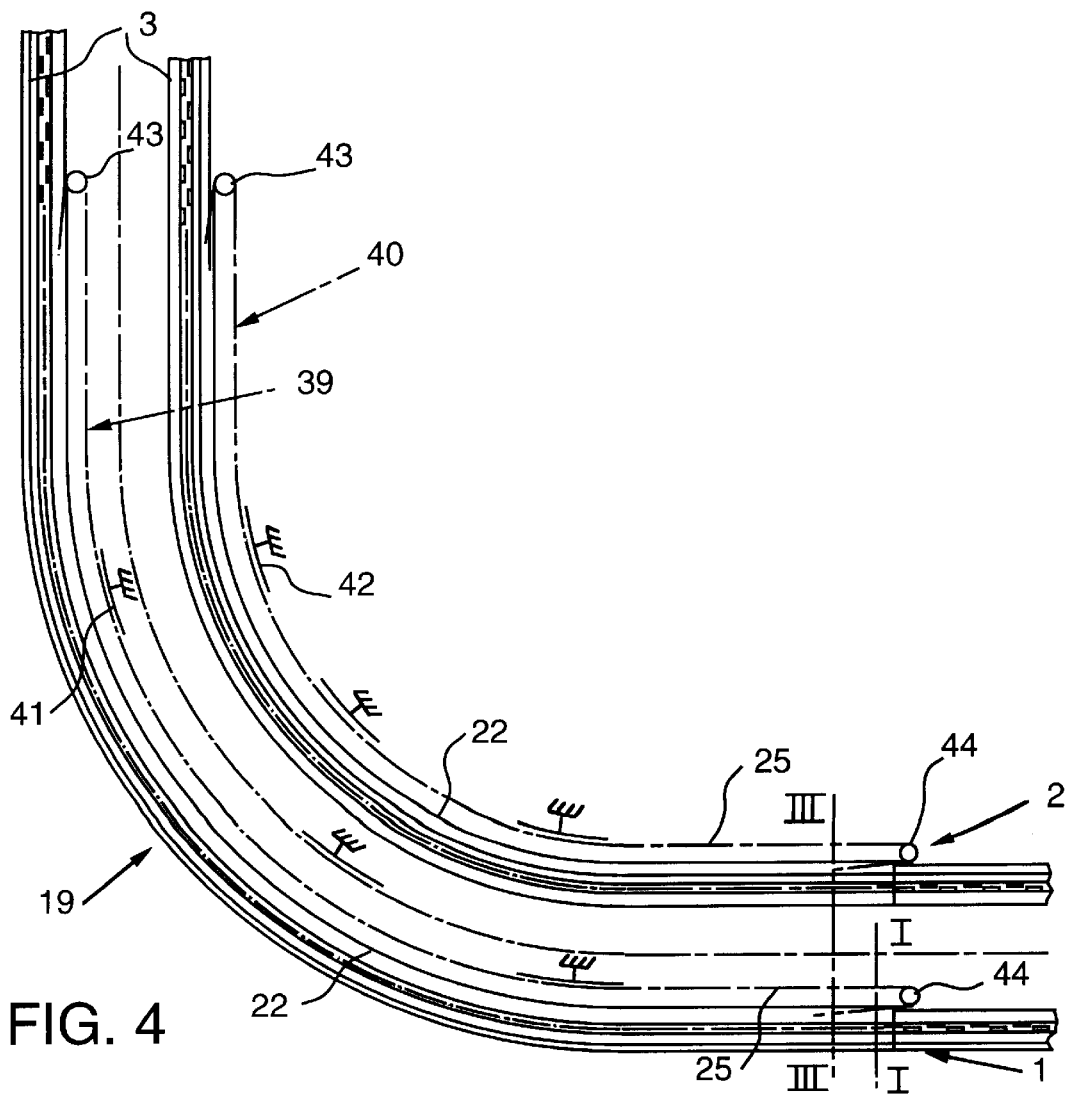
FIG. 4 shows a schematic representation of a conveying arc of a conveying path in a top view.

In the case of the conveying arc 19 shown in FIG. 4, which is implemented as a 90° circular arc in the present case, but which may also have a shape deviating from said 90° circular arc, especially the shape of other curved angle segments, the rail structure 3 has on the inner side thereof a respective lateral opening 20, 21 in the area of the upper channel 4 and of the lower channel 5. A support rail 22 is arranged such that it borders on said openings 20, 21 (cf, also FIG. 2). The support rail 22 is adapted to the curvature of the rail structure 3 and abuts on the inner side along the whole arc. On the level of the openings 20, 21, guide channels 23 and 24, respectively, are provided in the support rail 22. These guide channels 23 and 24 extend in the longitudinal direction of the support rail 22 parallel to the respective associated channels 4 and 5 of the rail structure 3, said channels 4 and 5 extending longitudinally through said rail structure 3 as well.

The guide channels 23 and 24 have provided therein a link-plate chain in the form of a U-bow chain 25 and 26, respectively. The U-bow chains 25 and 26 consist of separate link chains which have, however, essentially identical structural designs so that said structural design will only be explained on the basis of the U-bow chain 26. The U-bow chain 26 is, as far as its fundamental structural design is concerned, a simple link-plate chain with outer link plates 27 and hinge bolts 28 connecting said outer link plates and with inner link plates 29 which are interconnected by hinge sleeves that are not shown in detail. Rollers 30 are rotatably supported on these hinge sleeves, which are not shown. Each external chain link is provided with two outer link plates 27 and two hinge bolts 28 and each internal chain link is provided with two inner link plates 29 and two hinge sleeves connecting them as well as with rollers 30. A hinge bolt 28 of the external chain link extends through a respective hinge sleeve of the internal chain link. In addition, the chain 26 is provided with support bows 31 having a U-shaped cross-section and comprising two parallel U-legs 32 and a U-connector 33 extending transversely to said legs 32.

The U-legs 32 extend parallel to the inner link plates 29 and the outer link plates 27 and are arranged between them. Each U-leg 32 is secured to two neighbouring hinge bolts 28 and has essentially the same length as a chain link. It follows that the number of support bows 31 provided corresponds to the number of e.g. external chain links and internal chain links, respectively. The support bow 31 is provided with a support surface 34 which is orientated at right angles to the hinge bolt axis G of the accumulation conveyor chain 6. The support surface 34 has provided thereon a coating 35 of elastomeric material on which the end face 36 of the hinge bolt 12 rests. The respective U-bow chain 25 and 26 rests with its roller 30 on a guide rail 37 in the guide channel 23 or 24. The guide rail 37 is provided with a guide surface 38 which is orientated essentially parallel to the hinge-bolt axis A of the U-bow chains 25 and 26, respectively. Hence, the rollers 30 rest on and roll along said guide surface 38.

The hinge-bolt axis A of each U-bow chain 25 and 26, respectively, is arranged at right angles to the hinge bolt axis G of the accumulation conveyor chain 6 so that the force transmitted through the end face 36 of the hinge bolt 12 is transmitted essentially at right angles to the coating 35.

FIG. 1 only shows a single chain half of the U-bow chain 25 and of the U-bow chain 26, respectively. The return movement of the empty chain half, which is not shown, takes place outside of the support rail 22. The empty chain halves 39 and 40 of the upper U-bow chains 25 are shown in FIG. 4. These empty chain halves are guided by means of guide rails 41 and 42 along the back of the support rail 22 in parallel therewith so that the total width of the support rail 22 is comparatively small. Instead of guide rails 41 and 42 also any other kind of guide means, e.g. rollers or the like, can be used.

Since the upper chain half 7 and the lower chain half 8 of the accumulation conveyor chain 6 move in different directions, also the U-bow chain 25 and the U-bow chain 26 move in different directions. For these reasons, it is also necessary to use different chains for the support.

On the basis of FIG. 3, a cross-section through the total rail structure of a conveying path comprising an outer track 1 and an inner track 2 is shown. The cross-section of the inner track 2 differs from the cross-section of the outer track 1 only to an insignificant extent. One difference is to be seen in the fact that the marginal stop rail 18' of the inner track 2 is part of the support rail 22. Furthermore, the outer track 1 is additionally covered by means of a cover plate 45 so that the least possible amount of dirt will penetrate into the channel 4. The distance between the inner and outer tracks 1 and 2 depends on the articles to be conveyed. The articles must have a width which is smaller than the distance of the marginal stop rails 18 and 18', but the width must be sufficiently large for causing the articles to be constantly in contact with the accumulation conveyor rollers 15 of the accumulation conveyor chains 6.

The support by means of the U-bow chains 25 and 26 is only provided in the area of the conveying arc 19, since this is the location where the forces exerted by the chain are to be counteracted, said forces resulting from the curvature of the accumulation conveyor chains 6.

In the following, the mode of operation of the above-described embodiment will be explained in detail. Since the accumulation conveyor chain 6 is implemented as a so-called side-arc chain, it is able to carry out an arcuate movement in a plane extending through the hinge-bolt axis G. In order to achieve this, the accumulation conveyor chain 6 must, however, be guided, since according to simple mechanical laws it will endeavour to return to straight shape. These forces exerted by the chain must be counteracted in a suitable manner. This can be done best by means of a support element moving together with the accumulation conveyor chain 6 at the same speed so that no relative movement will take place between these elements. In the above embodiment, this support element is defined by a U-bow chain 25 and 26, respectively, which rolls with its rollers 30 on the guide rails 37 in a low-friction movement. The force is transmitted through the end faces 36 of the hinge bolts 12 via the elastomeric coating 35 and via the U-legs 36 to the hinge bolts 28 and via the rollers 30 to the guide surface 38. The U-bow chains 25 and 26 are laterally guided due to the fact that the guide rail 37 has a width which is smaller than the distance between the inner link plates 29 so that a guiding effect is given. Preferably, the distance between the individual chain links of the U-bow chains 25 and 26 is chosen such that one hinge bolt 12 rests on each support bow 31. The respective components are associated with one another when the unit is being assembled. The U-bow chains 25 and 26 need not be driven separately, since they are entrained automatically due to the pressure applied to the elastomeric coating 35 by the hinge bolts 12. The U-bow chains 25 and 26 are deflected by means of chain wheels 43 and 44 at the respective end of the conveying arc 19. In the present example, the whole support device in the area of the conveying arc 19 comprises four U-bow chains 25 and 26, respectively.

Such a support has the advantage that the inner area of the conveying arc is substantially free from components installed in this area so that the conveying path can, for example, also be guided around a column or the like.

What is claimed is:

1. A support device for applying a lateral guiding force in the case of side-arc link chains (6), comprising
    a side-arc link chain (6) and a separate support element (25, 26) moving in a region of a side-arc together with said side-arc link chain (6) and supporting it in that region laterally on the inner side of the chain arc, characterized in that
    the separate support element (25, 26) is defined by an endless traction means which contacts an inner side of the side-arc link chain at the beginning of the side-arc and releases the side-arc link chain at the end of said side-arc, and
    the endless traction means is guided with the aid of deflection means (43, 44) and supported by guide means (41, 42).

2. A support device according to claim 1, characterized in that the traction means is a link-plate chain (25, 26).

3. A support device according to claim 2, wherein the link-plate chain (25, 26) comprises chain links interconnected at hinge points, that each hinge point comprises a hinge bolt (28) and a hinge sleeve, that the chain links have attached thereto support bows (31) which have a substantially U-shaped cross-section and the U-legs (32) of which are connected to the hinge bolts (28), the U-connector (33) of said support bows (31) being provided with a support surface (34) for supporting the side-arc link chain (6).

4. A support device according to claim 3, wherein a damping coating (35) is applied to the support surface (34) of the link-plate chain (25, 26).

5. A support device according to claim 3, wherein the side-arc link chain (6) comprises chain links interconnected at hinge points, that each hinge point comprises a hinge bolt (12) and a hinge sleeve (14), and that the side-arc link chain (6) and the link-plate chain (25, 26) are arranged relative to one another in such a way that at least the number of hinge bolts (12) of the side-arc link chain (6) which is required for a sufficient supporting effect rests on the support surface (34) of the support bows (31) of the link-plate chain (25, 26).

6. A support device according to claim 5, wherein each hinge bolt (12) of the side-arc link chain (6) rests on a support surface (34) of a support bow (31) of the link-plate chain (25, 26).

7. A support device according to claim 5, wherein the hinge-bolt axes (G) of the side-arc link chain (6) are orientated transversely to the hinge-bolt axes (A) of the supporting link-plate chain (25, 26).

8. A support device according to claim 7, wherein the hinge-bolt axes (G) of the side-arc link chain (6) are orientated substantially perpendicular to the hinge-bolt axes (A) of the supporting link-plate chain (25, 26).

9. A support device according to claim 8, wherein the U-legs (32) of the support bow (31) are arranged substantially perpendicular to the hinge-bolt axis (A) of the link-plate chain (25, 26) and that the respective U-legs (32) of a support bow (31) are secured to two neighboring hinge bolts (28), that the U-connector (33) of each support bow (31) is arranged such that the support surface (34) extends substantially parallel to the hinge-bolt axes (A), and that the hinge bolts (12) of the side-arc link chain (6) rest on the support surface (34) via their end face (36) arranged on the inner side of the chain arc.

10. A support device according to claim 9, wherein the supporting link-plate chain (25, 26) is provided with rollers (30) which are rotatably supported on the hinge sleeves of said chain, that a guide rail (37) which is adapted to the chain arc and which has a guide surface (38) is provided as a guide means, and that the link-plate chains (25, 26) and the guide rail (37) are arranged in such a way that the rollers (30) rest on the guide surface (38) and are adapted to roll along said guide surface (38).

11. A support device according to claim 10, wherein the guide surface (38) is orientated parallel to the hinge-bolt axes (A) of the link-plate chain (25, 26) and that it has a width which is smaller than the smallest distance between two parallel opposed link plates (29) of the link-plate chain (25, 26).

12. A support device according to claim 1, wherein the side-arc link chain (6) is an accumulation conveyor chain which is guided in a guide-rail structure (3) and which comprises rollers (16) rolling on guide surfaces (9, 10) of said guide-rail structure (3).

13. A support device according to claim 12, wherein the conveying upper chain half (7) and the returning lower chain half (8) of the side-arc link chain (6) are arranged in said guide-rail structure (3), and that the upper chain half (7) has associated therewith a first support element (25) and the lower chain half (8) has associated therewith a second support element (26).

14. A support device according to claim 1, wherein guide elements (41, 42) are provided which urge the returning empty chain half (39, 40) of the support element (25, 26) into an at least approximately arcuate shape so that the width required for the support element (25, 26) is small.

15. A conveying path comprising at least two side-arc link chains (6) which are arranged in parallel to one another, said conveying path being provided with at least one conveying side arc (19), each side-arc link chain having a support device for applying a lateral guiding force, comprising a separate support element (25, 26) moving in a region of a side-arc together with said side-arc link chain (6) and supporting it in that region laterally on the inner side of the chain arc, wherein said separate support element (25, 26) is defined by an endless traction means which contacts an inner side of the side-arc link chain at the beginning of the side-arc and releases the side-arc link chain at the end of said side-arc, and the endless traction means is guided with the aid of deflection means (43, 44) and supported by guide means (41, 42).

\* \* \* \* \*